Aug. 8, 1961
D. PERLMAN
2,995,498
PREPARATION OF COBALAMINS
Filed July 17, 1957
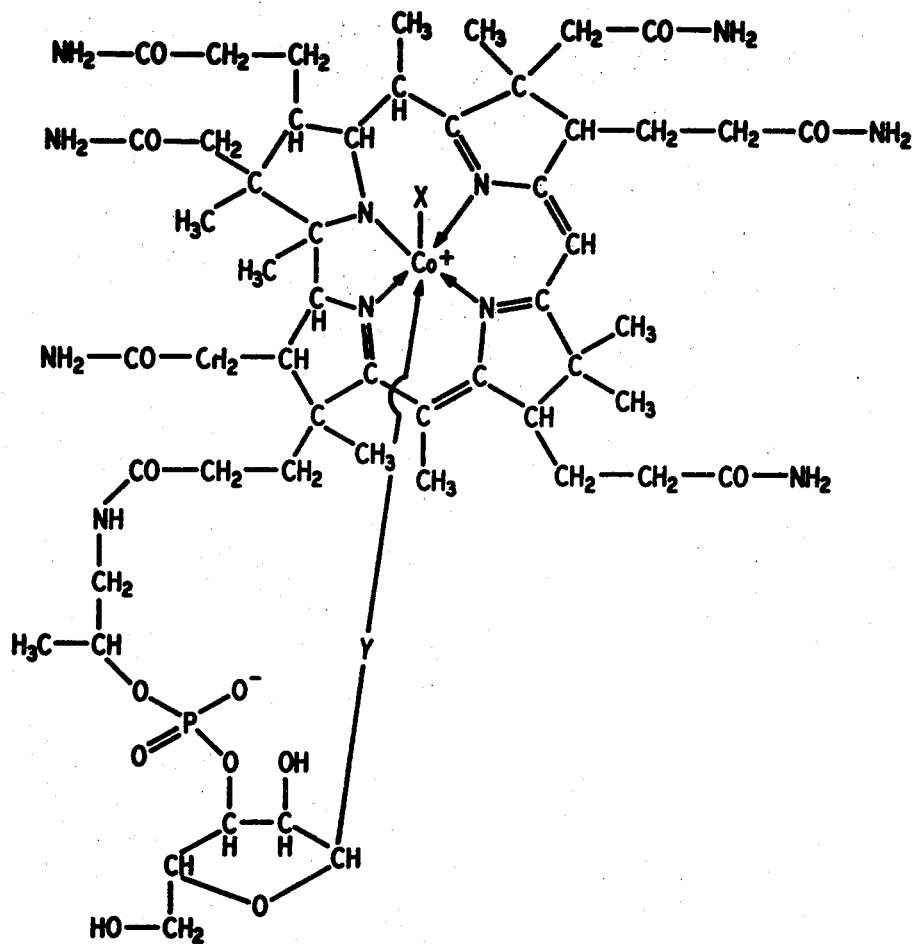
DAVID PERLMAN Inventor
By Laurence S. Levinson
Attorney United States Patent Office 2,995,498
Patented Aug. 8, 1961

2,995,498
PREPARATION OF COBALAMINS
David Perlman, Princeton, N.J., assignor to Olin Mathieson Chemical Corporation, New York, N.Y., a corporation of Virginia
Filed July 17, 1957, Ser. No. 672,485
5 Claims. (Cl. 195—114)

This application is a continuation-in-part of my parent applications, Serial Nos. 604,248, 613,341, now Patent No. 2,842,540, 628,191, now Patent No. 2,892,443, and 635,298, now Patent No. 2,870,444, filed August 15, 1956, October 1, 1956, December 13, 1956, and January 22, 1957, respectively.

This invention relates to an improved process for preparing physiologically active cobalamins and more particularly to the preparation of vitamin $B_{12}$ and other "unnatural" cobalamins possessing vitamin $B_{12}$-like activity by culturing a precursor-requiring vitamin $B_{12}$-producing microorganism of the genus Propionibacterium under substantially anaerobic conditions in a precursor-containing nutrient medium, and recovering the resulting physiologically active cobalamin.

This process affords a method whereby a variety of physiologically active cobalamins can be prepared employing the same microorganism and nutrients by varying only the precursor. [By the term "precursor" is meant a chemical substance which is utilized by the cobalamin-forming microorganism in the biosynthesis of the base of the nucleotide of the cobalamin, and which may be exemplified by 5,6-dimethylbenzimidazol, which is a precursor for vitamin $B_{12}$.]

Among the microorganisms which may be employed in the practice of this invention are those Propionibacteria which are known to produce vitamin $B_{12}$ in the presence of a $B_{12}$-precursor such as 5,6-dimethylbenzimidazol. These include *Propionibacterium arabinosum, P. thoenii, P rubrum, P. zeae, P. pentosaceum* and *P. petersonii.*

The nutrient media useful in the process of this invention include the usual sources of assimilable carbon and nitrogen. As sources of assimilable carbon, there may be used: (1) carbohydrates such as glucose, fructose, xylose, galactose, lactose, and maltose; (2) substances containing carbohydrates such as whey, milk, cornsteep liquor, grain mashes, and molasses; (3) polyhydric alcohols such as glycerol and mannitol; (4) fats, such as lard oil, soybean oil, corn oil, butterfat and cotton seed oil; and (5) fatty acids such as acetic propionic, pyruvic, stearic, palmitic, oleic, and linoleic. Sources of available nitrogen include: (1) organic nitrogen compounds such as proteinaceous materials e.g. casein, urea, soybean meal, fish meal, yeast or yeast products, whey or whey concentrates, amino acids and liver cake; and (2) inorganic compounds such as nitrates or ammonium compounds. The nutrient media should also include metallic cations including cobalt, molybdenum, potassium, sodium, magnesium, iron, copper, manganese, the anions chloride, sulfate, phosphate, and carbonate, and the vitamins thiamin, niacin, biotin, folic acid, pyridoxine, riboflavin, and p-aminobenzoic acid. These ions and vitamins may be present in the crude materials used in the nutrient medium.

The fermentation process may be carried out at temperatures from about 20° C. to about 40° C. and may be operated under essentially anaerobic or microaerophilic conditions. The precursor (leading to the formation of Y in the drawing) may be added to the fermenting culture either continuously or intermittently during the incubation period. After a sufficient incubation time (about one to ten days), the fermented medium may be dried and incorporated as a supplement into feeds fed to chickens and pigs, or the cobalamin present may be recovered in purified form, either as a hydroxocobalamin or, after treatment with potassium cyanide or other cyanide containing salts, as the cyano-cobalamin as more fully detailed in the examples following. If a cyanocobalamin is recovered, it can be converted to hydroxocobalamin and thence to other salts by methods known in the art [see Kaczka et al., Jour. Amer. Chem. Soc., 73, 3569 (1951)] to yield products which are also biologically active.

The cobalamins prepared by the process of this invention may be represented by the structural formula in the drawing, wherein X is a hydroxy radical or an anion, preferably the anion of a pharmacologically-acceptable acid. Examples of such anions are the anions of the mineral acids (e.g. chloride, bromide, sulfate, sulfite, nitrate and nitrite), cyanide, and cyanate. The compounds prepared by the process of this invention can thus be termed Y—X-cobalamins [using the nomenclature of Bernhauer et al., Angew. Chemie, 66, 776 (1954)], where Y represents the base present in the nucleotide portion of the cobalamin molecule and X represents the anion. The cobalamins synthesized by the process of this invention are biologically active, and hence can be used in lieu of vitamin $B_{12}$ (5,6-dimethylbenzimidazole-cyano-cobalamin) in promoting growth of chicks. For this purpose they are administered in the same manner as vitamin $B_{12}$ [e.g. as supplements to chick feeds, or by injection as described by Coates et al. Biochem. J. 64, 682 (1956)] the respective dose of the particular cobalamin depending on its potency relative to vitamin $B_{12}$.

The nature of the precursor employed depends on the physiologically active cobalamin desired. Thus, if vitamin $B_{12}$ is desired, 5,6-dimethylbenzimidazole or another vitamin $B_{12}$ precursor, such as 2,3-dimethyl-5,6-diaminobenzene, 2,3-dinitro-5,6-dimethylbenzene or 2,3-dimethyl-4-amino-5-nitrobenzene, may be used. Thus, as summarized in the following table, the nature of the resulting cobalamin will depend on the precursor chosen. In this table, the symbol Y is that in the accompanying drawing.

| Precursor | Product (Y-cobalamins) | |
|---|---|---|
| | Name | Y is— |
| 5,6-dimethylbenzimidazole<br>2,3-dimethyl-5,6-diaminobenzene<br>2,3-dinitro-5,6-dimethylbenzene<br>2,3-dimethyl-4-amino-5-nitrobenzene | 5,6-dimethylbenzimidazole-cobalamin | (structure shown) |

| Precursor | Product (Y-cobalamins) | |
|---|---|---|
| | Name | Y is— |
| Benzimidazole<br>1,2-diaminobenzene<br>1,2-dinitrobenzene<br>1-amino-2-nitro benzene | Benzimidazole-cobalamin | (benzimidazole structure) |
| 2-nitro-4-trifluoromethylaniline<br>5-trifluoromethylbenzimidazole<br>4-trifluoromethylphenylene-diamine-1,2 | 5-trifluoromethylbenzimidazole-cobalamin | (5-CF$_3$-benzimidazole structure) |
| 4-bromo-6-methoxybenzimidazole<br>3-bromo-5-methoxyphenylene-diamine-1,2 | 4-bromo-6-methoxybenzimidazole-cobalamin | (4-Br-6-OCH$_3$-benzimidazole structure) |
| Quinazoline | Quinazoline-cobalamin | (quinazoline structure) |
| 4(3H)-quinazoline | 3,4-dihydro-4-oxoquinazoline-cobalamin | (4-oxoquinazoline structure) |
| 2,4-dichloroquinazoline | 2,4-dichloroquinazoline-cobalamin | (2,4-diCl-quinazoline structure) |
| 4-chloro-8-nitroquinazoline | 4-chloro-8-nitroquinazoline-cobalamin | (4-Cl-8-NO$_2$-quinazoline structure) |
| 2(1), 4(3)-quinazolinedione | 1,2,3,4-tetrahydro-2,4-dioxoquinazoline-cobalamin | (2,4-dioxoquinazoline structure) |
| 8-amino-4-methoxy-quinazoline | 8-amino-4-methoxy-quinazoline-cobalamin | (8-NH$_2$-4-OCH$_3$-quinazoline structure) |
| 2-methyl 4-methyl-thioquinazoline | 2-methyl-4-methyl-thioquinazoline-cobalamin | (2-CH$_3$-4-SCH$_3$-quinazoline structure) |

| Precursor | Product (Y-cobalamins) | |
|---|---|---|
| | Name | Y is— |
| Phenazine | Phenazinecobalamin | *(phenazine structure)* |
| 2-nitrophenazine | 2-nitrophenazine-cobalamin | *(2-nitrophenazine structure with —NO$_2$)* |
| 2-aminophenazine | 2-aminophenazine-cobalamin | *(2-aminophenazine structure with —NH$_2$)* |
| 1-amino-2-hydroxy-phenazine | 1-amino-2-hydroxy-phenazine-cobalamin | *(structure with NH$_2$ and —OH)* |
| 1-acetamido-3-methoxyphenazine | 1-acetamido-3-methoxyphenazine-cobalamin | *(structure with NHCOCH$_3$ and —OCH$_3$)* |
| 2-hydroxyphenazine | 2-hydroxyphenazine-cobalamin | *(structure with —OH)* |
| 5-methylbenzimidazole | 5-methylbenzimidazole-cobalamin | *(5-methylbenzimidazole structure)* |
| Quinoxaline | Quinoxaline-cobalamin | *(quinoxaline structure)* |
| Benzotriazole | Benzotriazole-cobalamin | *(benzotriazole structure)* |

To show the homogeneity and activity of the cyanocobalamins formed in the examples of this invention, the following tests were conducted. For these tests the cobalamin was dissolved in water to give a concentration of between 10 and 100 micrograms per ml. of water:

TEST I

The solution of the cyanocobalamin is dried on a filter paper strip of Whatman 3 mm. paper in parallel with samples of 5,6-dimethylbenzimidazole-cyanocobalamin, adenine-cyanocobalamin, 2 - methyl-adenine-cyanocobalamin and Ford's factor B [Ford et al., Biochem. Jour., 59, 86 (1955)]. The sheet is placed in an ionophoresis apparatus [similar to that described by Holdsworth in Nature, 171, 148 (1953)], and the paper is impregnated with a solution of 0.5 N acetic acid containing 0.02%

KCN (w./v.). A potential of about 280 volts is applied for about 17 hours. The sheet is removed and dried. When dry (and free from odor of acetic acid), it is applied for 15 minutes to the surface of an agar plate seeded with a suspension of a vitamin $B_{12}$-requiring strain of *Escherichia coli* (ATCC 11105). [The agar medium contains (grams/liter): sucrose, 20 g.; citric acid, 1.2 g.; $(NH_4)_2HPO_4$, 0.4 g.; KCl, 0.08 g.; $MgCl_2 \cdot 6H_2O$, 0.418 g.; $MnCl_2 \cdot 4H_2O$, 0.036 g.; $FeCl_3 \cdot 6H_2O$, 0.023 g.; $ZnCl_2$, 0.021 g.; $CoCl_2 \cdot 6H_2O$, 0.04 g.; agar 15 g.; triphenyl tetrazolium chloride, 1 g.] After 18 hours incubation at 37° C., the agar plate is observed. The positions of zones of growth of bacteria (noted as red zones due to the reduction of the tetrazolium dye to the colored formazan) are noted in relation to the location on the paper strip where the samples are applied. The results obtained are recorded in the examples.

TEST II

An aliquot of the solution is applied to a spot about 3 inches from the end of a strip of Whatman No. 1 filter paper parallel to spots of known cobalamins. The chromatogram is developed by the descending method using a solvent mixture containing: 77 ml. of sec-butanol, 23 ml. of water, 0.25 ml. of KCN solution (5 gms./100 ml.) and 100 mg. of $KClO_4$ for 24 hours (at 25° C.). The strip is dried and applied to the seeded agar plate as in Test 1. After incubation, the zones of growth, representing the presence of vitamins of the $B_{12}$ group (measured with reference to the movement of 5,6-dimethylbenzimidazole-cyanocobalamin), are determined.

TEST III (a) An aliquot of the solution is applied to a spot about 3 inches from the end of a strip of Whatman No. 4 filter paper parallel to spots of known cobalamins. The chromatogram is developed by the descending method using a solvent mixture containing: sec-butanol, 100 ml.; water, 50 ml.; KCN [5% solution (w./v.)], 0.25 ml.; and $NH_4OH$ (concentrated), 1.0 ml. After 17 hours development (at 35° C.), the strips are dried and plated on seeded agar plates as in Test I. Zones of growth are determined.

(b) Same as Test IIIa with 1.0 ml. of glacial acetic acid substituted for the ammonium hydroxide.

TEST IV

An aliquot is assayed for the presence of substances stimulating the growth of *Lactobacillus leichmannii* (ATCC 7830) using as standard 5,6-dimethylbenzimidazole-cyanocobalamin and the method of the U.S. Pharmacopeia (15th edition). A value is determined.

TEST V

An aliquot is assayed by the method of Ford and Porter [Brit. J. Nutrition, 7, 326 (1953)], using the growth response of *Ochromonas malhamensis* and 5,6-dimethylbenzimidazole-cyanocobalamin as standard. A value is obtained.

When the cobalamins listed hereinbefore in the form of the cyano salts (X=CN) are analyzed by these tests, it was found that each of the cobalamins was active in Tests IV and V and the following additional results were obtained.

*Behavior of cobalamins with reference to 5,6-dimethylbenzimidazole-cyano-cobalamin*

| Cobalamin | Test I | Test II [1] | Test IIIa [1] | Test IIIb [1] |
|---|---|---|---|---|
| 5-methylbenzamidazole | Ionophoretically neutral. | 0.88 | 1.0 | 1.0 |
| Benzimidazole | do | 0.90 | 0.95 | 0.95 |
| Benzotriazole | do | 1.05 | 0.3 | 1.0 |
| 2,3-naphthimidazole | do | 1.0 | 1.0 | 1.0 |
| 5-trifluoromethylbenzimidazole. | do | 0.95 | 0.95 | 0.95 |
| 4-bromo-6-methoxy-benzimidazole. | do | 0.74 | 0.78 | 1.0 |
| 3,4-dihydro-4-oxo-quinazoline. | do | 0.60 | 0.35 | 0.6 |
| 2,4-dichloroquinazoline | do | 0.1 | 0.9 | 0.6 |
| 4-chloro-8-nitro-quinazoline | do | 0.9 | 1.02 | 1.0 |
| 1,2,3,4-tetrahydro-2,4-dioxoquinazoline. | do | 0.37 | 0.39 | 0.23 |
| 8-amino-4-methoxy-quinazoline. | do | 0.4 | 0.42 | 0.28 |
| 2-methyl-4-methylthio-quinazoline. | Same as adenine cobalamin. | 0.48 | 0.64 | 0.28 |
| Phenazine | Ionophoretically neutral. | 0.5 | 0.6 | 0.35 |
| 2-nitrophenazine | do | 0.9 | 0.24 | 0.6 |
| 2-aminophenazine | do | 0.8 | 0.97 | 1.0 |
| 1-amino-2-hydroxyphenazine. | do | 0.3 | 0.21 | 0.6 |
| 1-acetamido-3-methoxy-phenazine. | do | 0.13 | 1.05 | 0.66 |
| 2-hydroxyphenazine | do | 0.9 | 0.8 | 0.9 |
| Quinoxaline | do | 0.86 | 0.7 | 0.9 |

[1] Mobility relative to 5,6-dimethylbenzimidazole-cyano-cobalamin.

The following examples illustrate the invention (all temperatures being in centigrade):

EXAMPLE 1

*Vitamin $B_{12}$*

A medium containing 30 g. glucose, 20 g. autolyzed yeast, 0.01 g. $Co(NO_3)_2 \cdot 6H_2O$, and tap water to 1 liter is prepared and 500 ml. aliquots are added to 1 liter Erlenmeyer flasks. The flasks are plugged with nonabsorbent cotton and autoclaved at 121° for 30 minutes. When the flasks have cooled to room temperature, 10 g. of heat sterilized powdered calcium carbonate is added. The medium is then inoculated with 5 to 10 ml. of a culture of *Propionibacterium arabinosum* A.T.C.C. 4965 (American Type Culture Collection, Washington, D.C.) which has grown on this medium for 72 hours. The flasks are then placed on a reciprocating shaker (120 1-inch strokes per minute) located in a room maintained at 30°. A sterile alcoholic solution of 5,6-dimethylbenzimidazole is prepared by dissolving 50 mg. of the 5,6-dimethylbenzimidazole in 10 ml. of 70% (v./v.) aqueous ethanol and filtering the solution through a sterile fritted ultra fine glass filter. One ml. of the solution is added to the inoculated medium (after inoculation) and the supplementation is repeated at 24-hour intervals during the ensuing incubation period. The culture is allowed to grow in the medium and small aliquots are removed daily for pH measurement. When the pH falls below pH 6 (usually on the second day of incubation) 10 ml. of 2 N NaOH are added to adjust the pH to 6.8 to 7.2; this neutralization is repeated daily if the fermented medium is below pH 6. A solution of glucose is added after 3 days incubation so that the concentration of glucose in the fermenting medium is between 30 and 40 mg. per ml. (a sterile concentrated glucose solution containing 50 grams of glucose per 100 ml. is convenient for this purpose). After 6 days incubation, an aliquot is removed, treated, and analyzed as described above.

Instead of adding the 5,6-dimethylbenzimidazole solution once a day, continuous addition may be used with the concentration of the added solution adjusted and rates of addition controlled so that between 5 and 200 mg. of the benzimidazole are added per liter of medium during the incubation period. Compounds which may be substituted for the 5,6-dimethylbenzimidazole and yield 5,6-dimethylbenzimidazole-cobalamin are listed in Table I.

EXAMPLE 2

5-trifluoromethyl-benzimidazole-cyano-cobalamin 30 liters of a medium containing (per liter): glucose, 30 g.; autolyzed yeast, 20 g.; $Co(NO_3)_2 \cdot 6H_2O$, 0.01 g.; tap water, 1 liter; are placed in a stainless steel fermentation unit of 38 liters capacity, heated at 121° for 30 minutes, and cooled to 30°. About 2,000 ml. of a slurry of $CaCO_3$ (containing 600 g. of $CaCO_3$), sterilized by autoclaving, is then added together with 1 liter of *Propionibacterium arabinosum* A.T.C.C. 4965 culture grown on this medium for 72 hours in flasks shaken on a reciprocating shaker (120 1-inch strokes per minute), located in a 30° constant temperature room. A sterile alcoholic solution of 2-nitro-4-trifluoromethyl-aniline (sterilized by filtration through a fritted glass filter) containing 1 mg. per ml. is then added so that the final concentration of aniline is 5 mg. per liter (this supplementation being repeated at 24-hour intervals), and the culture is allowed to grow in the medium, under virtually anaerobic conditions while being agitated with a turbine mixer rotating at 87 r.p.m. After 72 hours incubation at 30°, a sterile solution of glucose is added so that the concentration of the glucose after addition is 30 g. per liter. After 5 days of incubation, the pH of the mixture is about 5.3. The fermented medium is then passed through a Sharples Super Centrifuge, or the cells containing 5-trifluoromethyl-benzimidazole-hydroxo-cobalamin are separated by filtration through a bed of filter-aid (Celite).

The collected cells are resuspended in 3 liters of propanol-water (80:20) containing 0.1 g./liter of potassium cyanide, and the suspension is heated at 80–90° for 20 minutes. After filtration, the filtrate is concentrated to about 750 ml. The pH is adjusted with 10 N sodium hydroxide to about 7.5, and 25 g. of activated carbon (Darco G60) is added and the mixture stirred. The activated carbon is removed by filtration and eluted with 700 ml. of acetone-water (65:35 v./v.), containing 0.1 g./liter of potassium cyanide. The acetone is concentrated to 400 ml., and filtered to remove suspended material. After filtration, the filtrate is successively extracted with three equal volumes of phenol-benzene (70 parts 88% phenol—30 parts benzene). The non-aqueous layer is separated, pooled and diluted with benzene so that the ratio of benzene to phenol is 15:1. The solution is extracted three times with 200 ml. portions of water, and the aqueous extracts are pooled and concentrated to about 50 ml. The resultant solution is mixed with 1.5 volumes of benzyl alcohol, and the rich-water is saturated with ammonium sulfate. The benzyl alcohol layer is separated, and the aqueous layer is reextracted with one-tenth its volume of benzyl alcohol. The rich benzyl alcohol extracts are combined and dried with sodium sulfate and chromatographed on an activated alumina column. The column is washed with 1 part of methanol and 2 parts of acetone. The rich material is eluted with methanol and the eluate dried under vacuum. The residue is dissolved in a minimum of water and acetone is added until slightly turbid. On standing for several days, 5-trifluoromethyl-benzimidazole-cyano-cobalamin in the form of red needlelike crystals are recovered. Spectroscopic examination shows maxima at 278, 361, 520 and 550 m$\mu$

[$E_{1cm}^{1\%}$ 204 (361 m$\mu$)]

EXAMPLE 3

5-trifluoromethyl-benzimidazole-hydroxo-cobalamin

To a solution of 10 mg. of 5-trifluoromethyl-benzimidazole-cyano-cobalamin in 10 ml. of water is added 50 mg. of platinum oxide catalyst, and the mixture is shaken with hydrogen at atmospheric pressure for 24 hours. The filtrate from the catalyst is evaporated in vacuo at 25°. The residue is dissolved in 1 ml. of water and 12 ml. of acetone are added. Dark red crystals of 5-trifluoromethyl-benzimidazole-hydroxo-cobalamin are found on standing for several days. Spectroscopic examination shows maxima at 315, 352, 415 and 530 m$\mu$

[$E_{1cm}^{1\%}$ 170 (352 m$\mu$)]

EXAMPLE 4

5-trifluoromethyl-benzimidazole-chloro-cobalamin 10 m. of 5-trifluoromethyl-benzimidazole-hydroxo-cobalamin is dissolved in 3 ml. of water and the solution adjusted to pH 4 with 0.1 N hydrochloric acid. The solution is then diluted with 10 ml. of acetone, and after a short time the chloro-cobalamin begins to crystallize in the form of dark red needles. The crystals are separated by centrifuging, washed with acetone and dried.

Similarly, by substituting hydrobromic acid, sodium nitrite and acetic acid, potassium cyanate and dilute sulfuric acid for the hydrochloric acid in the procedure of Example 4, the corresponding bromo, nitro, cyanato and sulfato-cobalamins, respectively, are obtained.

EXAMPLE 5

4-bromo-6-methoxy-benzimidazole-cyano cobalamin

Thirty liters of a medium containing (per liter): glucose, 30 g.; autolyzed yeast, 20 g.; $Co(NO_3)_2 \cdot 6H_2O$, 0.01 g.; tap water, 1 liter; are placed in a stainless steel fermentation unit of 38 liters capacity, heated at 121° for 30 minutes and cooled to 30°. About 2,000 ml. of a slurry of $CaCO_3$ (containing 600 g. of $CaCO_3$), sterilized by autoclaving, is then added together with 1 liter of *Propionibacterium arabinosum* A.T.C.C. 4965 culture grown on this medium for 72 hours in flasks shaken on a reciprocating shaker (120 1-inch strokes per minute), located in a 30° constant temperature room. A sterile aqueous-alcoholic solution of 3-bromo-5-methoxy-phenylenediamine-1,2 (sterilized by filtration through a fritted glass filter) containing 1 mg. per ml. is then added so that the final concentration of added compound is 5 mg. per liter (this supplementation being repeated at 24-hour intervals), and the culture is allowed to grow in the medium, under virtually anaerobic conditions while being agitated with a turbine mixer rotating at 87 r.p.m. After 72 hours incubation at 30°, a sterile solution of glucose is added so that the concentration of the glucose after addition is 30 g. per liter. After 5 days of incubation, the pH of the mixture is about 5.3. The fermented medium is then passed through a Sharples Super Centerfuge, or the cells containing 4-bromo-6-methoxy-benzimidazole-hydroxo-cobalamin are separated by filtration through a bed of filter-aid (Celite).

The collected cells are resuspended in 3 liters of propanol-water (80:20) containing 1 g./liter of potassium cyanide, and the suspension is heated at 80–90° for 20 minutes. After filtration, the filtrate is concentrated to about 750 ml. The pH is adjusted with 10 N sodium hydroxide to about 7.5, and 25 g. of activated carbon (Darco G60) is added and the mixture stirred. The activated carbon is removed by filtration and eluted with 700 ml. of acetone-water (65:35 v./v.), containing 0.1 g./liter of potassium cyanide. The acetone is concentrated to 400 ml., and filtered to remove suspended material. After filtration, the filtrate is successively extracted with three equal volumes of phenol-benzene (70 parts 88% phenol—30 parts benzene). The non-aqueous layer is separated, pooled and diluted with benzene so that the ratio of benzene to phenol is 15:1. The solution is extracted three times with 200 ml. portions of water, and the aqueous extracts are pooled and concentrated to about 50 ml. The resultant solution is mixed with 1.5 volumes of benzyl alcohol, and the rich-water is saturated with ammonium sulfate. The benzyl alcohol layer is separated, and the aqueous layer is reextracted with one-tenth its volume of benzyl alcohol. The rich benzyl alcohol extracts are combined and dried with sodium sulfate and chromatographed on an activated alumina column. The column is washed with 1 part of methanol and 2 parts of acetone. The rich material is eluted with methanol and the eluate dried under vacuum. The residue is dissolved in a minimum of water and acetone is added until slightly turbid. On standing for several days, 4-bromo-6-methoxy-benzimidazole-cyano-cobalamin in the form of red needlelike crystals are recovered. Spectroscopic examination shows maxima at 278, 361, 520 and 550 mμ

[$E_{1cm}^{1\%}$ 204 (361 mμ)]

EXAMPLE 6

*4-bromo-6-methoxy-benzimidazole-hydroxo-cobalamin*

To a solution of 10 mg. of 4-bromo-6-methoxy-benzimidazole-cyano-cobalamin in 10 ml. of water is added 50 mg. of platinum oxide catalyst, and the mixture is shaken with hydrogen at atmospheric pressure for 24 hours. The filtrate from the catalyst is evaporated in vacuo at 25°. The residue is dissolved in 1 ml. of water and 12 ml. of acetone are added. Dark red crystals of 4-bromo-6-methoxy-benzimidazole-hydroxo-cobalamin are found on standing for several days. Spectroscopic examination shows maxima at 315, 352, 415 and 530 mμ

[$E_{1cm}^{1\%}$ 170 (352 mμ)]

EXAMPLE 7

*4-bromo-6-methoxy-benzimidazole-chloro-cobalamin*

10 mg. of 4-bromo-6-methoxy-benzimidazole-hydroxo-cobalamin is dissolved in 3 ml. of water and the solution adjusted to pH 4 with 0.1 N hydrochloric acid. The solution is then diluted with 10 ml. of acetone, and after a short time the chloro-cobalamin begins to crystallize in the form of dark red needles. The crystals are separated by centrifuging, washed with acetone and dried.

Similarly, by substituting hydrobromic acid, sodium nitrite and acetic acid, potassium cyanate and dilute sulfuric acid for the hydrochloric acid in the procedure of Example 7, the corresponding bromo, nitro, cyanato and sulfato-cobalamins, respectively, are obtained.

EXAMPLE 8

*(3,4-dihydro-4-oxoquinazolin-1,3-diyl)-cyano-cobalamin*

Thirty liters of a medium containing (per liter): glucose, 30 g.; autolyzed yeast, 20 g.; $Co(NO_3)_2 \cdot 6H_2O$, 0.01 g.; tap water, 1 liter; are placed in a stainless steel fermentation unit of 38 liters capacity, heated at 121° for 30 minutes and cooled to 30°. About 2,000 ml. of a slurry of $CaCO_3$ (containing 600 g. of $CaCO_3$), sterilized by autoclaving, is then added together with 1 liter of *Propionibacterium arabinosum* A.T.C.C. 4965 culture grown on this medium for 72 hours in flasks shaken on a reciprocating shaker (120 1-inch strokes per minute), located in a 30° constant temperature room. A sterile aqueous-alcoholic solution of 4(3H) quinazolinone (sterilized by filtration through a fritted glass filter) containing 1 mg. per ml. is then added so that the final concentration of added compound is 5 mg. per liter (this supplementation being repeated at 24-hour intervals), and the culture is allowed to grow in the medium, under virtually anaerobic conditions while being agitated with a turbine mixer rotating at 87 r.p.m. After 72 hours incubation at 30°, a sterile solution of glucose is added so that the concentration of the glucose after addition is 30 g. per liter. After 5 days of incubation, the pH of the mixture is about 5.3. The fermented medium is then passed through a Sharples Super Centrifuge, or the cells containing (3,4-dihydro-4-oxoquinazolin-1,3-diyl)-hydroxo-cobalamin are separated by filtration through a bed of filter-aid (Celite).

The collected cells are resuspended in 3 liters of propanol-water (80:20) containing 1 g./liter of potassium cyanide, and the suspension is heated at 80–90° for 20 minutes. After filtration, the filtrate is concentrated to about 750 ml. The pH is adjusted with 10 N sodium hydroxide to about 7.5, and 25 g. of activated carbon (Darco G60) is added and the mixture stirred. The activated carbon is removed by filtration and eluted with 700 ml. of acetone-water (65:35 v./v.), containing 0.1 g./liter of potassium cyanide. The acetone is concentrated to 400 ml., and filtered to remove suspended material. After filtration, the filtrate is successively extracted with three equal volumes of phenol-benzene (70 parts 88% phenol–30 parts benzene). The non-aqueous layer is separated, pooled and diluted with benzene so that the ratio of benzene to phenol is 15:1. The solution is extracted three times with 200 ml. portions of water, and the aqueous extracts are pooled and concentrated to about 50 ml. The resultant solution is mixed with 1.5 volumes of benzyl alcohol, and the rich-water is saturated with ammonium sulfate. The benzyl alcohol layer is separated, and the aqueous layer is reextracted with one-tenth its volume of benzyl alcohol. The rich benzyl alcohol extracts are combined and dried with sodium sulfate and chromatographed on an activated alumina column. The column is washed with 1 part of methanol and 2 parts of acetone. The rich material is eluted with methanol and the eluate dried under vacuum. The residue is dissolved in a minimum of water and acetone is added until slightly turbid. On standing for several days, (3,4-dihydro-4-oxoquinazolin-1,3-diyl)-cyano-cobalamin in the form of red needlelike crystals is recovered. Spectroscopic examination shows maxima at 278, 361, 520 and 550 mμ

[$E_{1cm}^{1\%}$ 204 (361 mμ)]

The product, (3,4-dihydro-4-oxoquinazolin-1,3-diyl)-cyano-cobalamin, is readily obtained, under the same conditions, using *Propionibacterium pentosaceum* (A.T.C.C. Number 4875) or *Propionibacterium petersonii* (A.T.C.C. Number 4870) in place of *Propionibacterium arabinosum* in Example 8.

EXAMPLE 9

*(3,4-dihydro-4-oxoquinazolin-1,3-diyl)-hydroxo-cobalamin*

To a solution of 10 mg. of (3,4-dihydro-4-oxoquinazolin-1,3-diyl)-cyano-cobalamin in 10 ml. of water is added 50 mg. of platinum oxide catalyst, and the mixture is shaken with hydrogen at atmospheric pressure for 24 hours. The filtrate from the catalyst is evaporated in vacuo at 25°. The residue is dissolved in 1 ml. of water and 12 ml. of acetone are added. Dark red crystals of (3,4-dihydro-4-oxoquinazolin-1,3-diyl)-hydroxo-cobalamin on standing for several days. Spectroscopic examination shows maxima at 315, 352, 415 and 530 mμ

[$E_{1cm}^{1\%}$ 170 (352 mμ)]

EXAMPLE 10

*(3,4-dihydro-4-oxoquinazolin-1,3-diyl)-chlor-cobalamin*

10 mg. of (3,4-dihydro-4-oxoquinazolin-1,3-diyl)-hydroxo-cobalamin is dissolved in 3 ml. of water and the solution adjusted to pH 4 with 0.1 N hydrochloric acid. The solution is then diluted with 10 ml. of acetone, and after a short time the chloro-cobalamin begins to crystallize in the form of dark red needles. The crystals are separated by centrifuging, washed with acetone and dried.

Similarly, by substituting hydrobromic acid, sodium nitrite and acetic acid, potassium cyanate and dilute sulfuric acid for the hydrochloric acid in the procedure of Example 3, the corresponding bromo, nitro, cyanato and sulfato-cobalamins, respectively, are obtained.

EXAMPLE 11

Five hundred ml. aliquots of the medium described in Example 8 are placed in 1 liter Erlenmeyer flasks. The flasks are plugged with non-absorbent cotton and autoclaved for about 20 minutes at 121° C. When the liquid has cooled to room temperature, 10 grams of $CaCO_3$ powder (sterilized by heating in a 150° C. oven for 2 hours) are added. This medium is then inoculated with 10 ml. of a 72 hour old culture of *P. arabinosum* prepared as described in Example 8. To the inoculated medium is added 2 ml. of an alcoholic solution of a suitable quinazoline precursor so that the level of added quinazoline precursor is 10 mg. per liter of medium. This supplementation is repeated daily for 7 days. The flasks are then placed on a reciprocating shaker (120 1-inch cycles per minute) located in an incubator maintained at 30° C. After 3 days incubation, 20 ml. of a sterile glucose solution (50 grams glucose per 100 ml. solution) are added to each flask. At the end of the 7 day incubation period the fermented medium (pH is about 5.4) is heated at 90°–95° C. for 30 minutes and then centrifuged. Sufficient KCN is added to the supernatant liquid to give a concentration of 0.1 g. per liter. The liquid is then extracted thrice with ½ its volume of a phenol-benzene solution (70:30). The phenol-benzene layers are pooled and diluted with an equal volume of n-butanol. Distilled water equal to 1/10 the volume of the mixture is added, and the mixture shaken vigorously and then centrifuged.

When the precursor added to the fermentation is 2,4 dichloroquinazoline, the cobalamin formed, (2,4-dichloro-quinazolin-1,3-diyl)-cyano-cobalamin is ionophoretically neutral (at pH 2.5). It has a mobility of 0.9 that of 5,6 dimethylbenzimidazole-cyano-cobalamin in the filter paper chromatographic system containing sec-butanol, water, KCN, and acetic acid. In the system containing sec-butanol, water, KCN, and $KClO_4$, the mobility is about 0.1 that of the 5,6 dimethylbenzimidazole-cyan-cobalamin.

When the precursor added to the fermentation is 4-chloro-8-nitroquinazoline, the cobalamin formed, (4-chloro-8-nitro-quinazolin-1,3 - diyl) - cyano-cobalamin is ionophoretically neutral (at pH 2.5). It has a mobility equal to 5,6-dimethylbenzimidazole-cyano-cobalamin in the filter paper chromatographic system containing sec-butanol, water, KCN and acetic acid. In the system containing sec-butanol, water, KCN and $KClO_4$ the mobility is about 0.9 that of the 5,6-dimethylbenzimidazole-cyano-cobalamin.

When the precursor added to the fermentation is 2(1),4(3)-quinazolinedione, the cobalamin formed, (1,2,3,4-tetrahydro - 2,4 - dioxoquinazolin-1,3-diyl)-cyano-cobalamin, is ionophoretically neutral (at pH 2.5). It has a mobility of about 0.4 that of 5,6-dimethylbenzimidazole-cyano-cobalamin in the filter paper chromatographic system containing sec-butanol, water, KCN and acetic acid.

When the precursor added to the fermentation is 8-amino-4-methoxyquinazoline, the cobalamin formed, (8-amino-4-methoxyquinazolin - 1,3-diyl)-cyano-cobalamin, is ionophoretically neutral (at 2.5). In the filter paper chromatographic test using the solvent system containing sec-butanol, water, KCN and ammonium hydroxide it has a mobility 0.3 relative to that of 5,6-dimethylbenzimidazole-cyano-cobalamin.

When the precursor added to the fermentation is 2-ethyl-4(3H)-quinazolinethione, the cobalamin formed, (3,4-dihydro-2-ethyl - 4 - thiono-quinazolin-1,3-diyl)-cyano-cobalamin is ionophoretically neutral (at pH 2.5). In the filter paper chromatographic test using the solvent system containing sec-butanol, water, KCN and $KClO_4$ it has a mobility of 0.45 relative to that of 5,6-dimethyl-benzimidazole-cyano-cobalamin.

When the precursor added to the fermentation is 2-methyl-4-methylthioquinazoline, the cobalamin formed, (2-methyl-4-methylthioquinazolin-1,3-diyl)-cyano-cobalamin, moves at the same rate as adenine cobalamin in the ionophoresis (pH 2.5). In the filter paper chromatographic test using the solvent system containing sec-butanol, water, KCN and acetic acid it has the mobility of 0.64 relative to that of 5,6-dimethyl-benzimidazole-cyano-cobalamin. In the system containing sec-butanol, water, KCN ammonium hydroxide it has a mobility of 0.28 relative to that of 5,6-dimethylbenzimidazole-cyano-cobalamin; and in the system containing sec-butanol, water, KCN and $KClO_4$ the mobility is about 0.48 that of 5,6-dimethylbenzimidazole-cyano-cobalamin.

When the precursor added to the fermentation is 2,4-quinazolinedithiol, the cobalamin formed, (2,4-dithio-quinazolin-1,3-diyl)-cyano-cobalamin, moves at the same rate as adenine cobalamin in the ionophoresis (pH 2.5). It has a mobility of 0.24 that of 5,6-dimethylbenzimidazole-cyano-cobalamin in the filter paper chromatographic test using the solvent system containing sec-butanol, water, KCN and acetic acid. In the system containing sec-butanol, water KCN, and ammonium hydroxide, the mobility is about 0.65 that of the 5,6-dimethylbenzimidazole-cyano-cobalamin. In the system containing sec-butanol, water, KCN and $KClO_4$, the mobility is about 0.36 that of the 5,6-dimethylbenzimidazole-cyano-cobalamin.

EXAMPLE 12

*(Phenazin-9,10-diyl)-cyano-cobalamin*

30 liters of a medium containing (per liter): glucose, 30 g.; autolyzed yeast, 20 g.; $Co(NO_3)_2 \cdot 6H_2O$, 0.01 g.; tap water, 1 liter; are placed in a stainless steel fermentation unit of 38 liter capacity, heated at 121° for 30 minutes, and cooled to 30°. About 2,000 ml. of a slurry of $CaCO_3$ (containing 600 g. of $CaCO_3$), sterilized by autoclaving, is then added together with 1 liter of *Propionibacterium arabinosum* A.T.C.C. 4965 culture grown on this medium for 72 hours in flasks shaken on a reciprocating shaker (120 1-inch strokes per minute), located in a 30° constant temperature room. A sterile alcoholic solution of phenazine (sterilized by filtration through a fritted glass filter) containing 1 mg. per ml. is then added so that the final concentration of the phenazine is 5 mg. per liter (this supplementation being repeated at 24-hour intervals), and the culture is allowed to grow in the medium, under virtually anaerobic conditions while being agitated with a turbine mixer rotating at 87 r.p.m. After 72 hours incubation at 30°, a sterile solution of glucose is added so that the concentration of the glucose after addition is 30 g. per liter. After 5 days of incubation, the pH of the mixture is about 5.3. The fermented medium is then passed through a Sharples Super Centrifuge, or the cells containing (phenazin-9,10-diyl)-hydroxo-cobalamin are separated by filtration through a bed of filter-aid (Celite).

The collected cells are resuspended in 3 liters of propanol-water (80:20) containing 0.1 g./liter of potassium cyanide, and the suspension is heated at 80–90° for 20 minutes. After filtration, the filtrate is concentrated to about 750 ml. The pH is adjusted with 10 N sodium hydroxide to about 7.5, and 25 g. of activated carbon (Darco G60) is added and the mixture stirred. The activated carbon is removed by filtration and eluted with 700 ml. of acetone-water (65:35 v./v.), containing 0.1 g./liter of potassium cyanide. The acetone is concentrated to 400 ml., and filtered to remove suspended material. After filtration, the filtrate is successively extracted with three 400 ml. volumes of phenol-benzene (70 parts 88% phenol-30 parts benzene). The non-aqueous layer is separated, pooled and diluted with benzene so that the ratio of benzene to phenol is 15:1. The solution is extracted three times with 200 ml. portions of water, and the aqueous extracts are pooled and concentrated to about 50 ml. The resultant solution is mixed with 1.5 volumes of benzyl alcohol, and the rich-water is saturated with ammonium sulfate. The benzyl alcohol layer is separated, and the aqueous layer is reextracted with one-tenth its volume of benzyl alcohol. The rich benzyl alcohol extracts are combined and dried with sodium sulfate and chromatographed on an activated alumina column. The column is washed with 1 part of methanol and 2 parts of acetone. The rich material is eluted with methanol and the eluate dried under vacuum. The residue is dissolved in a minimum of water and acetone is added until slightly turbid. On standing for several days (phenazin-9,10-diyl)-cyano-cobalamin in the form of red needlelike crystals is recovered. Spectroscopic examination shows maxima at 361, 520 and 550 mμ.

[E$_{1cm}^{1\%}$ 204 (361 mμ)]

The product (phenazin-9,10-diyl)-cyano-cobalamin is readily obtained, under the same conditions, using *Propionibacterium pentosaceum* (ATCC number 4875) or *Propionibacterium petersonii* (ATCC number 4870) in place of *Propionibacterium arabinosum* in Example 12.

EXAMPLE 13

(Phenazin-9,10-diyl)-hydroxo-cobalamin

To a solution of 10 mg. of (phenazin-9,10-diyl)-cyano-cobalamin in 10 ml. of water is added 50 mg. of platinum oxide catalyst, and the mixture is shaken with hydrogen at atmospheric pressure for 24 hours. The filtrate from the catalyst is evaporated in vacuo at 25°. The residue is dissolved in 1 ml. of water and 12 ml. of acetone are added. Dark red crystals of (phenazin-9,10-diyl)-hydroxo-cobalamin are found on standing for several days. Spectroscopic examination shows maxima at 352, 415 and 520 mμ

[E$_{1cm}^{1\%}$ 170 (352 mμ)]

EXAMPLE 14

(Phenazin-9,10-diyl)-chloro-cobalamin 10 mg. of (phenazin-9,10-diyl)-hydroxo-cobalamin is dissolved in 3 ml. of water and the solution adjusted to pH 4 with 0.1 N hydrochloric acid. The solution is then diluted with 10 ml. of acetone, and after a short time the chloro-cobalamin begins to crystallize in the form of dark red needles. The crystals are separated by centrifuging, washed with acetone and dried.

Similarly, by substituting hydrobromic acid, sodium nitrite and acetic acid, potassium cyanate, dilute phosphoric and dilute sulfuric acid for the hydrochloric acid in the procedure of Example 14, the corresponding bromo, nitro, cyanato, phosphato and sulfatocobalamins, respectively, are obtained.

EXAMPLE 15

(2-nitrophenazin-9,10-diyl)-cyano-cobalamin

Aliquots of the autolyzed yeast-glucose-Co(NO$_3$)$_2$·6H$_2$O—water medium described in Example 12 are placed in Erlenmeyer flasks (500 ml. per filter flask is a suitable quantity). The flasks are plugged with non-absorbent cotton and autoclaved for 20 minutes at 121°. After cooling to room temperature, 10 grams of calcium carbonate powder (previously sterilized by autoclaving at 120° for 30 minutes and heating in a 150° oven for 1 hour) is added. The flasks are inoculated with 10 ml. of a 72 hour culture of *Propionibacterium arabinosum* A.T.C.C. 4965 and placed on a reciprocating shaker (120 1-inch strokes per minute) located in an incubator maintained at 30°. Two ml. of a sterile alcoholic solution of 2-nitrophenazine is added so that the final concentration of the phenazine is 5 mg. per liter. This addition is repeated 6 times at 24 hour intervals. Twenty ml. of a solution containing 50 grams of glucose per 100 ml. is added after 3 days incubation. After 6 days incubation on the shaker the fermented medium is heated at 90–95° for 20 minutes. Ten ml. of a KCN solution (5 g./100 ml.) are added per liter of fermented medium and the solids separated by centrifugation. The supernatant liquid (pH approx. 5.6) is extracted thrice with ½ its volume of a phenol-benzene solution (70 parts 88% liquefied phenol-30 parts benzene). The benzene extracts are pooled and diluted with an equal volume of n-butanol. A quantity of water equivalent to 1/10 the volume of the phenol-benzene-butanol solution is added and the mixture shaken vigorously and centrifuged. The red colored aqueous layer is separated and analyzed by the tests described herein before.

When analyzed by the ionophoretic method (pH 2.5) a cobalamin with ionophoretically neutral properties is found. When analyzed by the filter paper chromatographic method using the solvent system sec-butanol, 100; water, 50; 5% KCN, 0.25 ml. and glacial acetic acid, 1.0 ml. a cobalamin with mobility of 0.24 that of 5,6-dimethylbenzimidazole-cyano-cobalamin is found. The solution containing (2 - nitrophenazin-9,10-diyl)-cyano-cobalamin also stimulates the growth of a cobalamin-requiring culture of *Ochromonas malhamensis*.

EXAMPLE 16

(2-aminophenazin-9,10-diyl)-cyano-cobalamin

The procedure and method of testing the aqueous extract described in Example 15 is repeated except that a molar equivalent of 2-aminophenazine is used instead of 2-nitrophenazine. The cobalamin is found to be ionophoretically neutral (when the pH of the system is 2.5). When studied by filter paper chromatography using the system containing sec-butanol, water, KCN, and glacial acetic acid, the new cobalamin has a mobility of 0.45 relative to that of 5,6 - dimethylbenzimidazole-cyano-cobalamin. If the system containing sec-butanol, water, KCN, and KClO$_4$ is used, the mobility of new cobalamin is 0.28 of that observed when 5,6-dimethylbenzimidazole-cyano-cobalamin is added. The new cobalamin stimulates the growth of *Ochromonas malhamensis*.

EXAMPLE 17

(1-amino-2-hydroxy-phenazin-9,10-diyl)-cyano-cobalamin

The procedure and method of testing the aqueous extract described in Example 15 is repeated except that a molar equivalent of 1-amino-2-phenazinol is used in place of 2-nitrophenazine.

The cobalamin formed is found to be ionophoretically neutral (when the pH of the system is 2.5); and in the filter paper chromatographic system using sec-butanol, water, KCN, and acetic acid for developing solvent, the (1-amino-2-hydroxyphenazin-9,10-diyl)-cyano-cobalamin has a mobility 0.21 that of 5,6-dimethylbenzimidazole-cyano-cobalamin. The new cobalamin stimulates the growth of *Ochromonas malhamensis*.

EXAMPLE 18

(1-acetamido-3-methoxy-phenazin-9,10-diyl)-cyano-cobalamin

The procedure and method of testing the aqueous extract described in Example 15 is repeated except that a molar equivalent of 1-acetamido-3-methoxy-phenazine is used instead of the 2-nitrophenazine. The new cobalamin, (1-acetamido-3-methoxy-phenazin-9,10 - diyl)-cyano-cobalamin is found to be ionophoretically neutral (when the pH of the system is 2.5); and the mobility of the new cobalamin in the filter paper chromatographic system using sec-butanol, water, KCN, and KClO$_4$ is 0.13 that of 5,6 - dimethylbenzimidazole - cyano - cobalamin. The new cobalamin stimulates the growth of *Ochromonas malhamensis*.

In an analogous manner, by substituting a molar equivalent of 3-amino-2-phenazinol or 2-bromophenazine in place of 2-nitrophenazinol in Example 15, the corresponding cobalamins, namely (3 - amino - 2 - hydroxy-phenazin-9,10-diyl)-cyano-cobalamin and (2-bromo-phenazin-9,10-diyl)-cyano-cobalamin are formed.

Similarly, by following the procedure of Example 1 but substituting the precursor indicated and employing the microorganism as designated the following cobalamins have been prepared:

| Cobalamin synthesized (from precursor listed in Table I) | Organism used in the fermentation operations | | | | | |
|---|---|---|---|---|---|---|
| | P. arabinosum (ATCC 4965) | P. rubrum (ATCC 4871) | P. thoenii (ATCC 4872) | P. zeae (ATCC 4964) | P. pentosaceum (ATCC 4875) | P. petersonii (ATCC 4870) |
| | Example No. | | | | | |
| 5,6-dimethyl-benzimidazole | | 19 | 20 | 21 | 22 | 23 |
| 5-methyl-benzimidazole | 24 | 25 | 26 | 27 | 28 | 29 |
| Benzimidazole | 30 | 31 | 32 | 33 | 34 | 35 |
| Benzotriazole | 36 | 37 | 38 | 39 | 40 | 41 |
| 5-trifluoromethyl-benzimidazole | | 42 | 43 | 44 | 45 | 46 |
| 4-bromo-6-methoxy-benzimidazole | | 47 | 48 | 49 | 50 | 51 |
| 2-hydroxy-phenazine | 52 | | | | | |
| Quinoxaline | 53 | | | | | |

The invention may be variously otherwise embodied within the scope of the appended claims.

What is claimed is:

1. A process for preparing a physiologically active cobalamin which comprises culturing a precursor-requiring vitamin $B_{12}$-producing microorganism of the genus Propionibacterium selected from the group consisting of *Propionibacterium arabinosum, Propionibacterium thoenii, Propionibacterium rubrum, Propionbacterium zeae, Propionibacterium pentosaceum* and *Propionibacterium petersonii* under substantially anaerobic conditions in a cobalamin precursor-containing nutrient medium wherein the precursor is selected from the group consisting of a quinazoline, a phenazine, quinoxaline, benzotriazole and 2-nitro-4-trifluoromethylaniline, and recovering the resulting physiologically active cobalamin.

2. The process of claim 1 wherein the precursor is 2-nitro-4-trifluoromethylaniline.

3. The process of claim 1 wherein the precursor is a quinazoline.

4. The process of claim 1 wherein the precursor is a phenazine.

5. The process of claim 1 wherein the microorganism is *Propionibacterium arabinosum*.

References Cited in the file of this patent

UNITED STATES PATENTS

| | | |
|---|---|---|
| 2,715,602 | Hargrove | Aug. 16, 1955 |
| 2,764,521 | Leviton | Sept. 25, 1956 |
| 2,816,856 | Sudarsky et al. | Dec. 17, 1957 |
| 2,893,988 | Bernhauer et al. | July 7, 1959 |

FOREIGN PATENTS

| | | | |
|---|---|---|---|
| A20,954 | IVa/30h | Germany | Feb. 2, 1956 |
| A19,703 | IVa/30h | Germany | Mar. 8, 1956 |
| 948,734 | | Germany | Mar. 8, 1956 |

OTHER REFERENCES

Darken: The Botanical Review, vol. 19, No. 2, February 1953, article pp. 90 to 130. Pages 108–109, 114–117 relied on.

Bernhauer et al.: Angewandte Chemie, vol. 66, No. 24, Dec. 21, 1954, pp. 776–780.

Fantes: Biochem. Jour. 59, 1 (1955) pp. 79–82.

Ford et al.: Biochem. Jour., January 1955, vol. 59, No. 1, pp. 85–93.